United States Patent [19]

Kole

[11] 4,154,678
[45] May 15, 1979

[54] SKIMMER DEVICE

[76] Inventor: Lawrence T. Kole, 9027 Jackwood, Houston, Tex. 77036

[21] Appl. No.: 750,201

[22] Filed: Dec. 13, 1976

[51] Int. Cl.² .................................................. B01D 33/18
[52] U.S. Cl. .................................... 210/97; 210/242 R
[58] Field of Search ................ 210/242 S, 242 R, 121, 210/122, DIG. 25, 528, 521, 532, 416, 525, 97, 103, 104

[56] References Cited

U.S. PATENT DOCUMENTS

| 658,639 | 4/1978 | Guion | 210/416 R |
|---|---|---|---|
| 2,837,212 | 6/1958 | Schmid | 210/166 |
| 3,349,030 | 10/1967 | Sarge | 210/528 X |
| 3,465,889 | 9/1969 | Young, Jr. | 210/525 |
| 3,534,859 | 10/1970 | Amero et al. | 210/DIG. 25 |
| 3,741,391 | 6/1973 | Dombach | 210/242 S |
| 3,752,317 | 8/1973 | Lithen | 210/242 |
| 3,762,557 | 10/1973 | Tudor et al. | 210/DIG. 25 |
| 3,853,768 | 12/1974 | Bagnulo | 210/242 S |
| 3,876,540 | 4/1975 | Falxa | 210/242 X |
| 3,944,489 | 3/1976 | Derzhavts | 210/242 R |
| 4,024,063 | 5/1977 | Mori | 210/242 R |
| 4,032,449 | 6/1977 | De Visser et al. | 210/DIG. 25 |

FOREIGN PATENT DOCUMENTS 2308048  8/1974  Fed. Rep. of Germany ....... 210/242 S Primary Examiner—Theodore A. Granger
Attorney, Agent, or Firm—M. Lee Murrah

[57] ABSTRACT

Apparatus for removing floatable material from the surface of a carrier fluid including a hollow receptacle having a continuous side wall and a bottom having an opening centrally located therein. A pump is mounted within the hollow receptacle such that the pump inlet is positioned over the receptacle bottom opening and the pump outlet is connected to an exhaust conduit line mounted in the side wall and extending outwardly therefrom to a container or sump. The receptacle is positioned such that the top rim of the side receptacle wall rides at the surface of the carrier fluid so that floatable material, solid or liquid, is transferred over the rim into the receptacle and for solid materials, an opening is provided in the receptacle bottom for flowing upwardly into the receptacle to combine with the skimmed solid floatable substance for pumping outwardly of the receptacle through the exhaust conduit line.

10 Claims, 6 Drawing Figures

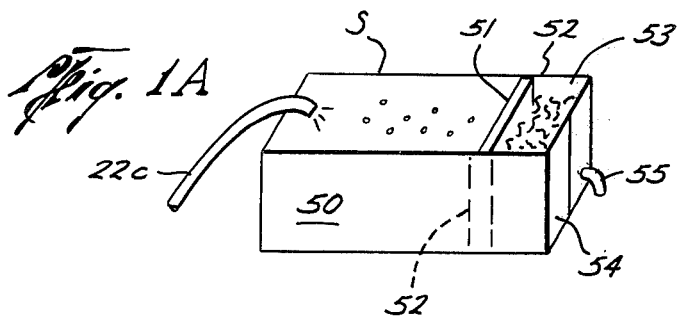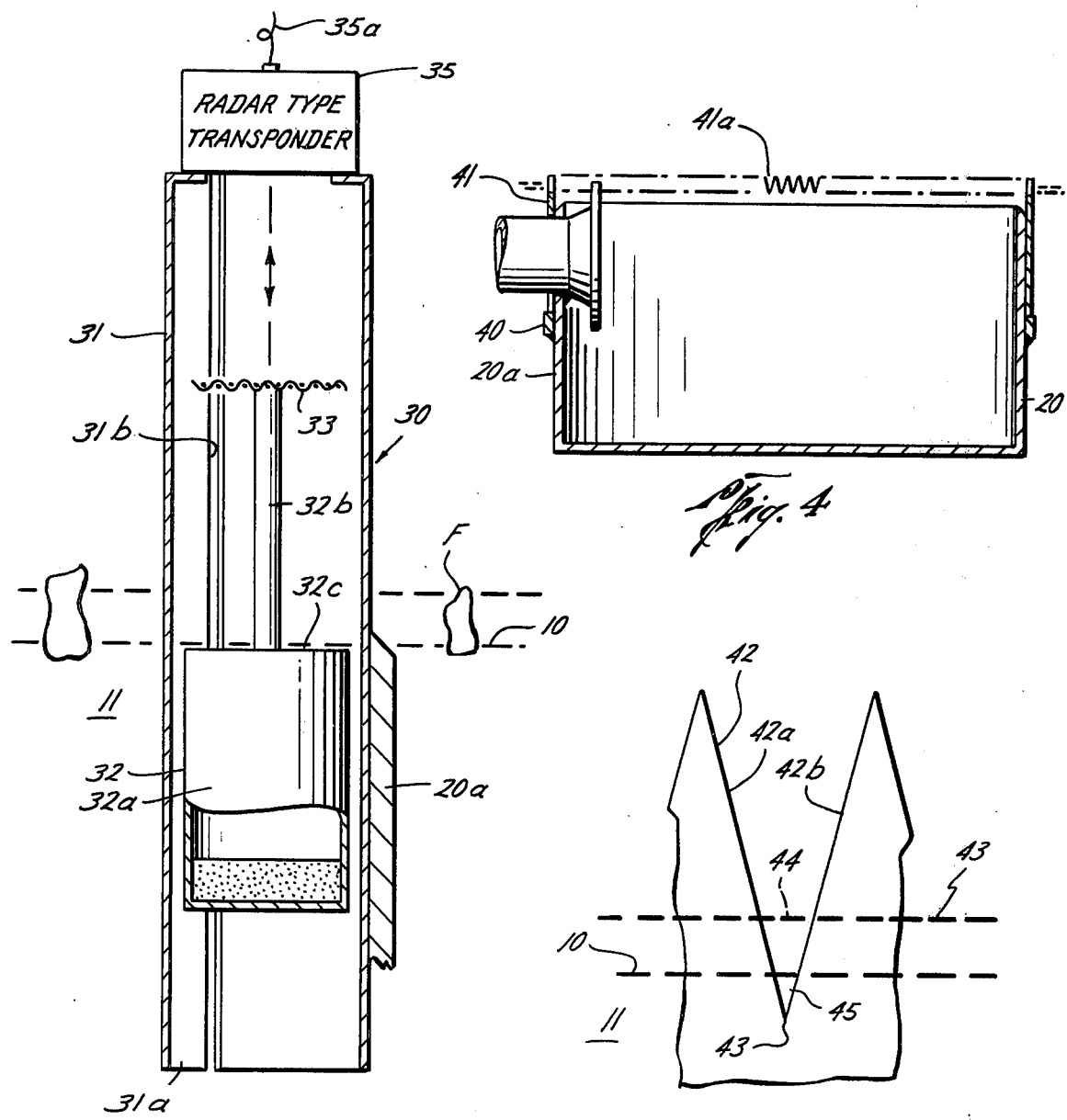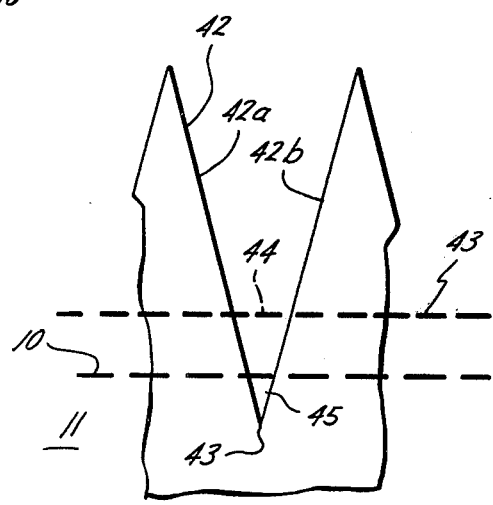

SKIMMER DEVICE

BACKGROUND OF THE INVENTION

The field of this invention is skimming devices for skimming floating solids and/or liquids off of the top of a carrier fluid.

Situations requiring the removal of floating solids and/or liquids from the surface of another liquid are innumerable. For example, it has been found necessary to remove oil from the surface of water, polyethylene pellets from water and sewage scum from the surface of water in a waste treatment plant. As presently advised, there are several attempted solutions now being used in industry. For example, it is known to simply place a "trash" pump at the surface of the fluid containing the floating solids or liquids; however, the pump either runs dry, clogs or pumps entirely too much of the carrier fluid, thus defeating the ultimate purpose—separating the floating material from the carrier liquid. Another attempt involves the use of various types of mechanical skimming devices for engaging the surface of the floating solid or liquid and physically attempting to skim or move the floating solids and/or liquids to an isolated area where the floating solids and/or liquids are removed. Floating skimmers have also been tried, but with only limited success. One of the difficulties with floating skimmers, which ride upon the surface of the carrier fluid by means of buoyant force on it, is that floating skimmers tend to bounce around whenever they are touched in any way by an operator or just from agitation of the carrier fluid itself.

SUMMARY OF THE INVENTION

It is the object of this invention to provide a new and improved skimming device for removing a maximum amount of floating solids from the surface of a carrier liquid.

It is a further object of this invention to provide a new and improved skimmer device for removing a maximum amount of floating liquid from the surface of a carrier liquid while removing a minimal amount of the carrier liquid itself.

It is a further object of this invention to provide a skimmer device which includes a hollow receptacle positioned at the surface of the carrier liquid for maximizing flow of floating liquid into the receptacle with a minimum amount of carrier liquid flowing into the receptacle.

It is a further object of this invention to provide a new and improved skimmer device which is positioned at the level of the carrier liquid in spite of changes in that level.

It is a further object of this invention to provide a new and improved skimmer device which includes a receptacle having a serrated edge for maximizing the flow of floatable liquid into the receptacle while minimizing the flow of carrier liquid into such receptacle.

These objects and other objects are accomplished by the skimmer device of this invention. To remove floating solids, the skimmer device of this invention includes a hollow receptacle which is open at the top and substantially closed at the bottom thereof. The hollow receptacle is formed by a continuous side wall joined to a bottom which is closed except for a central opening therein. An exhaust conduit is mounted in the side wall. The exhaust conduit includes a first end which terminates within the hollow receptacle and a second end positioned outwardly of the receptacle. The second end is adapted for connection to a container or sump for receiving the floating solids that are removed from the carrier fluid. A pump is mounted within the receptacle. For solid removal, the inlet of the pump is positioned directly over the opening in the bottom of the receptacle; and, level positioning means are provided for positioning the receptacle in the carrier fluid such that the floating substance, either solid or liquid, is transferred into the receptacle. For liquid removal, the bottom of the receptacle has no opening and a crown ring is provided for maximizing the flow of floating liquid to be removed while minimizing the flow of carrier fluid.

Other features of this invention will be described in the following detailed description. This summary is intended only as a general description of the objects and structure of this invention. The exact subject matter claimed is set forth in the claims following the detailed description of the preferred embodiment.

BRIEF DESCRIPTION OF THE DRAWINGS

FIG. 1A is a perspective view of a remotely positioned container for receiving the skimmed solids and carrier liquid and removing the carrier liquid;

FIG. 3 is a sectional view of the level positioning device for maintaining the receptacle of the skimmer device of this invention at the surface of the carrier liquid in spite of variations in the level of the carrier liquid;

FIG. 4 is a sectional view of an alternate or additional embodiment of this invention which includes a serrated ring which forms the top rim of the skimmer receptacle for removing a floating liquid from a carrier liquid; and FIG. 5 is an enlarged view of a serrated portion of the ring of FIG. 4.

DESCRIPTION OF THE PREFERRED EMBODIMENT

Figure 1:
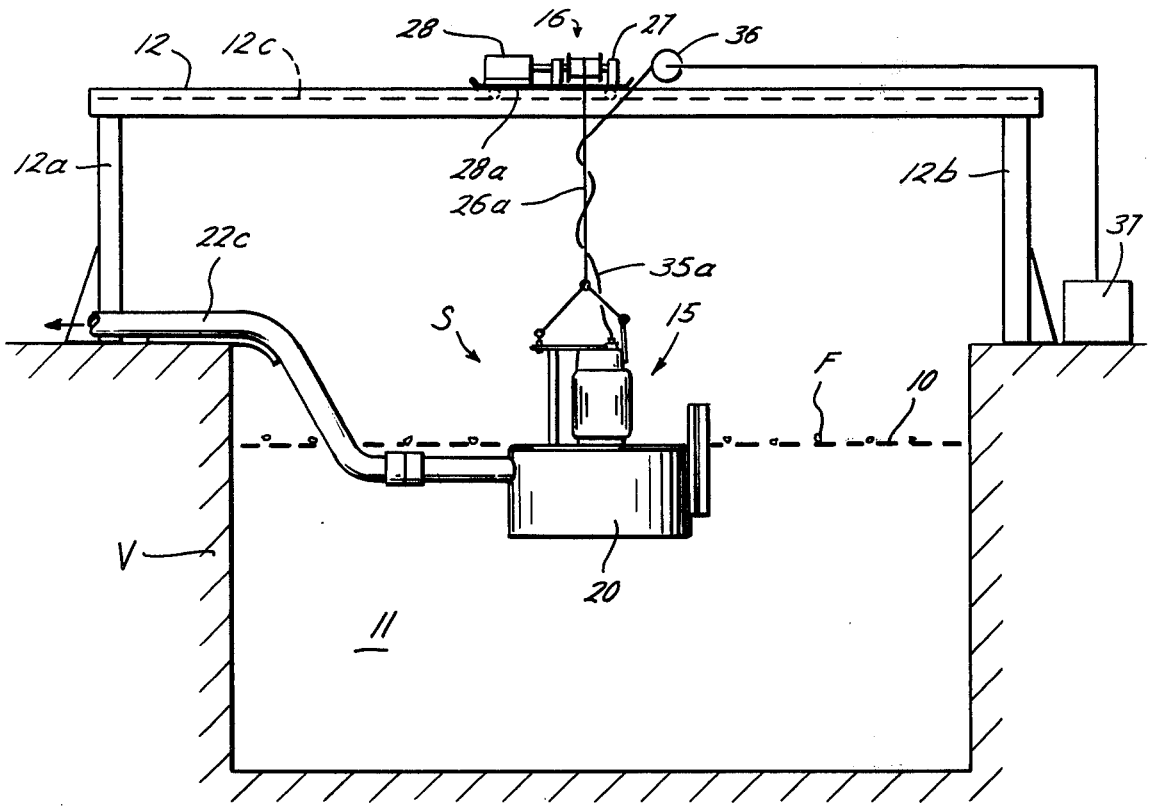
FIG. 1 is a side view partly in schematic of the skimmer device of the preferred embodiment of this invention illustrated at the surface of the carrier liquid for removing floating substances, either solid or liquid, therefrom.
Figure 2:
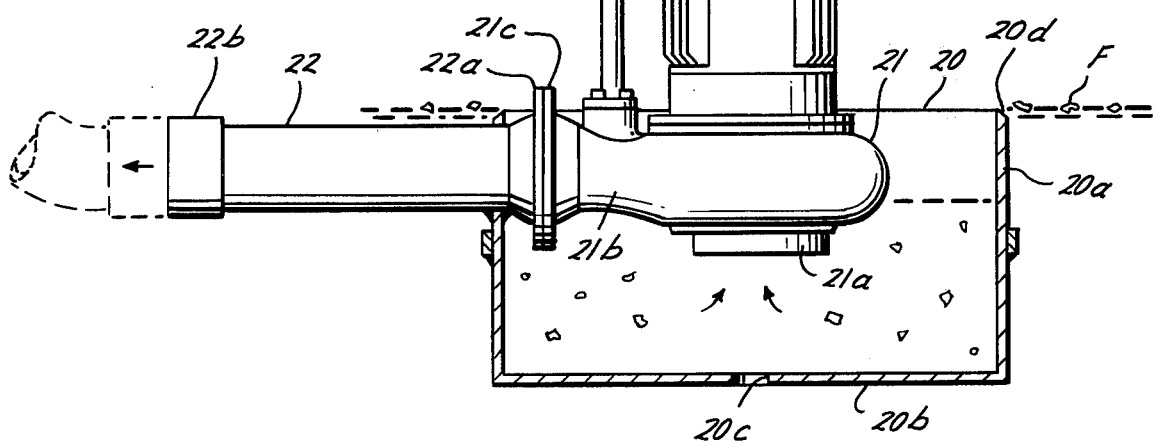
FIG. 2 is a partly sectional view of the skimmer device of the invention of FIG. 1 for removing floating solids.

Referring to the drawings, the letter S generally designates the skimmer device of this invention for removing a floating substance generally designated as F off of the surface 10 of carrier fluid 11. The carrier fluid 11 may be practically any liquid and the floating substance F may be either solid or liquid or a combination of both. The floating substance F may float entirely on the surface 10 of the carrier liquid 11; or, the floating substance may actually float at the top of the carrier fluid 11 and thus extend only partly out of the carrier liquid surface 10. Generally, solid floating material F will of course extend only partly out of the surface 10 while liquid substances will approximately float on top of the carrier liquid surface 10. Of course, the actual interface between floating liquid substance F and the surface 10 of the carrier liquid may not be as clearly represented as shown in the drawings. But generally, a floating liquid F is lighter in density than the carrier liquid 11 and thus will be located substantially on the surface 10 of the carrier liquid and may be removed therefrom by the skimmer device S of this invention. Such carrier liquid 11 having the floating substance F thereon may be located in any pit or vat V or other containment structure. The floating substance F is a combination of liquid and solid as illustrated in FIGS. 1-3.

The skimmer device S includes a support framework 12 formed of vertically extending braces 12a and 12b located at the sides of the vat V and a horizontally extending beam 12c which is supported by the vertical braces 12a and 12b.

A pump-receptacle assembly is located in the carrier liquid 11 for receiving the floating substance F off of the surface 10 of liquid carrier 11 and transferring the floating substance outwardly of the vat V to a suitable destination such as another vessel or sump S (FIG. 1A) or the like. The position of the pump-receptacle assembly 15 in the liquid carrier 11 at the surface 10 is controlled by level control means 16 mounted with the support 12.

The pump-receptacle assembly 15 includes a receptacle 20 formed by a continuous, circular side wall 20a joined to a circular bottom 20b. The continuous side wall 20a terminates in a top rim 20d which is tapered on the outside thereof to enhance the flow or other transfer of floating substance F into the receptacle 20. A pump 21 is mounted within the receptacle 20 at the top center thereof. A motor 21d is mounted onto the pump 21 for driving the pump. The pump 21 may be one of several different varieties which are capable of pumping liquids and/or solids. One example of such a pump 21 and motor 21d is Style CS 3082 available from Flygt Corporation of Norwalk, Conn. It is understood that any similarly suitable pump and motor can be used. The pump 21 includes an inlet 21a and an outlet 21b which terminates in outlet flange 21c. The motor 21d can also be air-driven or otherwise powered.

An exhaust conduit 22 formed of a hollow, cylindrical pipe member is mounted within the receptacle wall 20a and terminates in flange end portion 22a, which connects to outlet flange end portion 21c of the pump 21. The conduit 22 is directed radially outwardly from the center of the opening 20c and terminates in an outer end 22b which is adapted for suitable connection to an exhaust line 22c extending to the container or sump which receives the floating substance F.

Motor 21d includes an upwardly extending bracket member 23 which is connected through turnbuckle 23a to a center ring 24. A horizontally extending bracket 25 extends from the top of the motor 21d into connection with a vertical pipe member bracket 26 which is bolted onto the top of the pump outlet 21b. A second turnbuckle arrangement 25a extends from the end of the horizontal bracket member 25 into connection with the center ring 24. The center ring 24 is attached to a winch line 26a and thus to winch 27 supported on the top of the beam 12c. The winch 27 is of any suitable commercial variety and may be driven by electric motor 28. The electric motor 28 is electrically controlled by the level positioning means 16 to be described hereinafter.

The horizontal beam 12c includes a track which mounts a dolly 28a. The dolly 28a supports the winch 27 and motor 28 such that the entire pump-receptacle assembly may be moved out of the vat V for inspection or for other purposes.

The top rim 20d of the receptacle 20 is positioned approximately at the surface 10 of the carrier liquid 11 so that a substance F floating on the surface 11 will flow or otherwise transfer into the receptacle 20. The pump 21 then transfers such floating substances out of the receptacle 20 and through exhaust conduit 22 and line 23 to a remote container.

For removal of solid floating material, an opening 20c is provided to allow the simultaneous transfer of a controlled amount of carrier liquid 10 into the receptacle from the bottom thereof for mixing with the skimmed floating substance F to aid the pump 21 in pumping the material out of the receptacle 20. The actual size of the centrally located opening 20c will depend upon the application. It is contemplated that in some instances the amount of simultaneous flow of carrier liquid from the bottom will be more necessary than in other instances.

The pump-receptacle assembly 15 may be mounted on some type of stand which extends down to the bottom of the vat V. This would be particularly applicable in situations where the level of the carrier fluid 11 is controlled. However, in situations where the level of the carrier fluid varies, then the level control means 16 including winch 27 are used to correspondingly vary the position of the pump-receptacle 15.

FIG. 1A illustrates a sump S which is the ultimate delivery site for pumped floating solids and carrier liquid pumped out of the receptacle 20. The sump S includes a container 50 having a generally rectangular configuration. A flitering screen 51 is removably mounted in mounting slits 52 on opposite walls of the container 50. Filter material such as hay is positioned in the filtering chamber 53 formed by the screen 51. And, container end 54 has mounted therein an exhaust valve 55. The end 54 may include suitable doors or other access means for the purpose of changing the filter material such as hay in the chamber 53. Thus, the exhaust conduit 22c delivers a combination of floating solids and carrier material removed by the pump-receptacle assembly 15 to the container 50. The combination of the screen 51 and filtering medium such as hay in chamber 53 acts to separate out the floating solids from the carrier liquid, which carrier liquid flows out of exhaust 55 and back to vat V. In this manner, the floating solids will be isolated for further removal or disposal.

The level control means 16 includes a buoyant signal means 30 mounted for movement in the carrier liquid 11 with the pump-receptacle 15. The buoyant signal means 30 includes a hollow, cylindrical housing 31 which is attached to the outside of the continuous side wall 20a of the receptacle 20. The hollow housing 31 is open at the bottom 31a thereof and further has a vertically extending slot 31b. The slot 31b and bottom opening 31a combine to receive the carrier liquid 11 such that the level of the carrier liquid surface within the interior of the hollow housing 31 is the same as the level within the vat V. The purpose of utilizing a vertical slot to receive the carrier liquid 11 is to allow for the passage of the carrier liquid while preventing the transfer of floatable substances F, particularly solids, which might interfere with the operation of the buoyant device 32 positioned within housing 30. Further, the slit cooperates with the bottom 31a to allow for changes in the level of the carrier liquid surface 10 within the hollow housing 30 while preventing wave splashing or rippling which might otherwise at least temporarily provide a false liquid level within the housing 31.

The buoyant device 32 includes a cylindrical, hollow buoyant member 32a having mounted thereon a hollow support rod 32b which supports at the top thereof a grid or other surface of signal reflective material 33. The buoyant portion 32a is hollow and adapted to receive a necessary amount of weight-giving material such as sand or shot for the purpose of adjusting the buoyant device 32 such that the top 32c thereof rides at the surface 10 of the carrier liquid 11. The structure of the buoyant device 32 allows the buoyant device to be very responsive to actual changes in the level of the liquid carrier within the housing 31. The purpose of locating a substantial part of the structure of the buoyant device below the surface 10 of the carrier liquid is to further limit undue influence of temporary level fluctuation such as wave action or the like on the buoyant device 32.

A radar-type transponder or sonic sensor 35 is mounted onto the top of the housing 31. The sonic sensor 35 emits an ultrasonic beam downwardly into the housing 31 and provides an output signal through line 35a to the remainder of the level control means 16 in response to the signal reflected off of reflective surface 33. Such a sonic sensor as 35 is available from Wesmar Level Monitor Division of Seattle, Wash. or from Endress+Hauser, Inc. of Greenwood, Ind. The sonic sensor 35 is actually providing an output signal indicative of changes of the level of surface of liquid carrier surface 10 within the housing 31 by sensing the return time of the sonic signal reflected off of grid 33.

The sonic sensor 35 provides an output signal through line 35a to electrical control circuitry located at 36 on the beam 12c in operative connection with winch motor 28 and circuitry located at 37 to the side of the vat V. The control circuitry 36 and 37 is provided to control the winch motor 28 for moving the pump-receptacle assembly 15 upwardly or downwardly in response to changes in the level of carrier liquid within the housing 31. Such electrical circuitry is within the ordinary skill of the electronics art and will not be discussed further.

In operation and use of the skimmer device S of the invention of FIGS. 1-3, the pump-receptacle assembly 15 is lowered along winch line 26 into the vat V. The upper, tapered rim 20d of the receptacle 20 is initially positioned at the surface 10 of the carrier liquid 11. The size of the central opening 20c for the receptacle 20 is designed to maximize the removal of the floating substance from the receptacle 20. The taper 20d allows for solid material within the floating substance F to flow or otherwise transfer into the receptacle 20 with greater ease. Should the level of the surface 10 of the carrier liquid 11 change, the relative position of the buoyant member 32 within the housing 31 will also change. This changes the sonic signal reflected off of the reflective material 33, which in turn provides a signal through electrical circuitry at 36 and 37 to the winch motor 28, which moves the entire pump-receptacle assembly upwardly or downwardly as necessary to maintain the rim 20d at the surface 10 of the carrier liquid 11. Thus, the pump-receptacle assembly 15 is not moved in response to a change in the depth of floating material F located on top of the carrier liquid 11; but, rather, the pump-receptacle 15 moves upwardly and downwardly in response to a change in the level of the carrier liquid itself. During use, the floating solids are skimmed off the surface of carrier fluid 10 and fall down into receptacle 20. At the same time, a volume of carrier fluid 10 flows upwardly from bottom opening 20c. The pump inlet 21a is in direct line to receive the upwardly flowing carrier fluid and the upwardly flowing carrier fluid velocity tends to draw solids into the pump. Further, the downward fall of the floating solids into the receptacle along with the spilling over of a limited amount of carrier fluid causes a turbulent action which combines with the upward lift of carrier fluid flowing upwardly through the bottom opening 20c which substantially helps to prevent any clogging of the pump 21 positioned in the receptacle.

FIGS. 4 and 5 illustrate an additional embodiment for the receptacle 20 for removing floating liquids 43. Referring to FIG. 4, the receptacle 20 (without opening 20c) is illustrated with a mounting ledge 40 welded thereon approximately intermediate of the height of the continuous side wall 20a. Pump 21, not shown, is also positioned as in FIGS. 1 and 2. A flow control ring 41 is mounted on the top of the receptacle 20 onto the annular ledge 40. The top end 41a of the flow control ring 41 is serrated or sawtoothed to provide a plurality of converging flow paths 42 for limiting the flow of carrier liquid 11 over the rim 41 while increasing the relative amount of flow of a floatable substance F such as surface liquid 43. The crown ring 41 is particularly adapted for use when the floating substance on the surface 10 of the carrier liquid 11 is liquid. Referring to FIG. 5, where a single converging flow path 42 is illustrated, the converging flow path 42 includes vertically converging wall portions 42a and 42b which intersect at 43. The receptacle 20 of FIG. 4 is positioned in the carrier liquid 11 such that the numerous circumferentially disposed converging flow paths 42 of serrated rim 41a are positioned at the height of the floating liquid substance 43 so that the floating liquid substance 43 is free to flow through a truncated triangular area portion 44 into receptacle 20 while the carrier liquid 11 is confined to a smaller triangular area or region 45. In this manner, the amount of flow of floating liquid substance 43 into the receptacle 20 is increased while the amount of flow of carrier liquid 11 is decreased.

Whenever the flow control ring 41 is utilized, the serrated rim 41a is positioned such that the floating material F, which in FIG. 5 is a liquid 43, flows into a converging area 41; but, the area 44 within the converging flow path 42 receiving the floating substance F is greater than the area 45 receiving the liquid carrier 11. Therefore, the relative amount of floating liquid 43 transferred into the receptacle 20 is increased and the amount of carrier liquid 11 is decreased.

The foregoing disclosure and description of the invention are illustrative and explanatory thereof, and various changes in the size, shape and materials as well as in the details of the illustrated construction may be made without departing from the spirit of the invention.

For example, it has been described herein that the liquid carrier and floating substance F may be practically any types of material. The floating material F may be either solid or liquid or a combination of both. The material for the receptacle 20 may be of any suitable material necessary to withstand any deleterious effects of the particular liquid carrier 11 and floating material F in which the pump-receptacle is used. Further, the pump 21 may be of any suitable type of pump which is capable of pumping either solid or liquid or both; and, the motor 21d may be either an electric motor as illustrated here or an air-driven motor or other power means.

I claim:

1. A skimmer apparatus for collecting solid material floating in a liquid, comprising:
   a hollow receptacle with open upper edges providing inlet means thereinto;

a pump located within said receptacle just above the bottom thereof, said pump constructed and arranged with inlet opening thereinto located in the lower side thereof;

an opening in the bottom of said receptacle opposite said pump inlet opening, said receptacle bottom opening being of smaller diameter than said pump inlet opening; and conduit means connected to said pump for the discharge of material collected by said pump, whereby material flowing over said receptacle upper edge is mixed with liquid introduced through said receptacle bottom opening by pump suction and head pressure to permit mixing of said solid material and liquid for discharge of said material by said pump.

2. The skimmer apparatus as set forth in claim 1 wherein said conduit is connected to the upper portion of said receptacle.

3. Skimmer apparatus as set forth in claim 1 further including means for positioning said receptacle at the surface of the liquid in response to changes in the level of said liquid.

4. The skimmer apparatus as set forth in claim 3, wherein said level positioning means includes:

control means for moving said receptacle upwardly or downwardly in response to change in the level of the liquid; and buoyant signal means for positioning in said liquid for movement with the level of said liquid and for providing a signal to said control means in response to a change in the level of said liquid.

5. The skimmer apparatus as set forth in claim 4, wherein said buoyant signal means includes:

a hollow housing attached to said receptacle for fluid communication with said liquid;

a buoyant member positioned in the liquid in said hollow housing, said buoyant member moving upwardly and downwardly with said housing in response to changes in the level of the liquid therein; and sonic means mounted with said housing for providing an electrical signal to said control means in response to the position of said buoyant member of said housing.

6. The skimmer apparatus as set forth in claim 5, wherein said buoyant member includes:

a buoyant portion positioned in the liquid and a signal reflecting member attached to said buoyant portion and extending upwardly therefrom to a position above level of the fluid.

7. The skimmer apparatus as set forth in claim 6, wherein said sonic means directs a sonic signal within said housing for reflection off said reflective surface in order to respond to changes in the level of the liquid.

8. The skimmer apparatus as set forth in claim 1 wherein said upper edges of said receptacle is tapered on the outside thereof for enhancing movement of floating solid materials into said receptacle.

9. The skimmer apparatus as set forth in claim 1, wherein said conduit means is supportively attached to the sidewall of said receptacle, whereby said pump is suspended above the bottom of said receptacle.

10. A skimmer apparatus for collecting solid material floating in a liquid, comprising:

a hollow receptacle with open upper edges providing inlet means thereinto;

a pump located within said receptacle just above the bottom thereof, said pump constructed and arranged with inlet opening thereinto located in the lower side thereof;

an opening in the bottom of said receptacle opposite said pump inlet opening, said receptacle bottom opening being of such diameter to permit less fluid to enter said receptacle than the inlet capacity of said pump; and conduit means connected to said pump for the discharge of material collected by said pump;

whereby material flowing over said receptacle upper edge is mixed with liquid introduced through said receptacle bottom opening by pump suction and head pressure to permit mixing of said solid material and liquid for discharge of said material by said pump.

* * * * *